United States Patent
Kim et al.

(10) Patent No.: US 9,542,383 B2
(45) Date of Patent: Jan. 10, 2017

(54) EXAMPLE-BASED ERROR DETECTION SYSTEM FOR AUTOMATIC EVALUATION OF WRITING, METHOD FOR SAME, AND ERROR DETECTION APPARATUS FOR SAME

(71) Applicant: SK TELECOM CO., LTD., Seoul (KR)

(72) Inventors: Seunghwan Kim, Seongnam-si (KR); Eunsook Lee, Seoul (KR); Seongmook Kim, Seoul (KR); Dongnam Kim, Seoul (KR); Sung Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 134 days.

(21) Appl. No.: 14/097,209

(22) Filed: Dec. 4, 2013

(65) Prior Publication Data

US 2014/0093845 A1    Apr. 3, 2014

Related U.S. Application Data

(63) Continuation of application No. PCT/KR2012/008749, filed on Oct. 24, 2012.

(30) Foreign Application Priority Data

Oct. 26, 2011 (KR) .......................... 10-2011-0109812

(51) Int. Cl.
*G09B 11/00* (2006.01)
*G06F 17/27* (2006.01)
(Continued)

(52) U.S. Cl.
CPC ......... *G06F 17/2755* (2013.01); *G06F 17/273* (2013.01); *G06F 17/274* (2013.01);
(Continued)

(58) Field of Classification Search
CPC .. G06F 17/274; G06F 17/2755; G06F 17/273; G06F 17/2818; G06F 17/28; G10L 15/08; G10L 15/1822; G10L 15/19
(Continued)

(56) References Cited

U.S. PATENT DOCUMENTS

2008/0208567 A1    8/2008  Brockett et al.
2011/0170777 A1*   7/2011  Inagaki ............ G06F 17/30705
                                                         382/177

FOREIGN PATENT DOCUMENTS

CN        101206673 A      6/2008
CN        101568918 A     10/2009
(Continued)

OTHER PUBLICATIONS

Øistein E. Andersen, "Grammatical error prediction", Jan. 2011, University of Cambridge Computer Laboratory, pp. 1-163.*
(Continued)

*Primary Examiner* — Jack Yip
(74) *Attorney, Agent, or Firm* — Hauptman Ham, LLP (57) ABSTRACT

An error detection system for automatically evaluating writing includes: an example construction apparatus to collect example sentences including various literary styles, to break up the collected example sentences in units of morphemes, and to construct the example sentences in an example-based index database (DB); and an error detection apparatus to break up an input sentence in units of morphemes, to generate one or more morpheme sequences bound in arbitrary window sizes based on one or more of morphemes of the broken-up input sentence, to search the example-based index DB for each of the generated morpheme sequences, and to detect an error according to a frequency at which said each morpheme is arranged in a corresponding morpheme
(Continued)

sequence among morpheme sequences searched for through the example-based index DB.

11 Claims, 9 Drawing Sheets

(51) Int. Cl.
*G06F 17/28* (2006.01)
*G10L 15/08* (2006.01)
*G10L 15/19* (2013.01)

(52) U.S. Cl.
CPC .......... *G06F 17/2818* (2013.01); *G06F 17/28* (2013.01); *G10L 15/08* (2013.01); *G10L 15/19* (2013.01)

(58) Field of Classification Search
USPC .......................................................... 434/162
See application file for complete search history.

(56) References Cited

FOREIGN PATENT DOCUMENTS

| | | |
|---|---|---|
| CN | 101655837 A | 2/2010 |
| CN | 101802812 A | 8/2010 |
| KR | 1020080098162 A | 11/2008 |
| KR | 100892004 B1 | 4/2009 |
| KR | 1020090084818 A | 8/2009 |
| KR | 100978223 B1 | 8/2010 |
| WO | 2008136558 A1 | 11/2008 |

OTHER PUBLICATIONS

International Search Report mailed Feb. 26, 2013 for PCT/KR2012/008749.
Chinese Office Action for application No. 201280034880.3 dated Aug. 31, 2015.
Chinese Office Action for corresponding Chinese Patent Application No. 201280034880.3 issued on Apr. 21, 2016.

\* cited by examiner

EXAMPLE-BASED ERROR DETECTION SYSTEM FOR AUTOMATIC EVALUATION OF WRITING, METHOD FOR SAME, AND ERROR DETECTION APPARATUS FOR SAME

CROSS-REFERENCE TO RELATED APPLICATION

The present application is a continuation of International Application No. PCT/KR2012/008749 filed on Oct. 24, 2012 which is based on, and claims priority from, Korean Patent Application Serial No. 10-2011-0109812 filed on Oct. 26, 2011. The disclosures of the above-listed applications are hereby incorporated by reference herein in their entirety.

FIELD

The present disclosure relates to an example-based error detection system, method and apparatus for automatically evaluating writing.

BACKGROUND

The statements in this section merely provide background information related to the present disclosure and do not constitute prior art.

Recently, college entrance exams and scholastic ability tests of enterprises are changing in order to evaluate actual English proficiency in speaking or writing.

That is, the Ministry of Education (MOE), in order to enhance proficiency in English, has developed the National English Ability Test (NEAT) (an Internet-based listening, reading, speaking, and writing assessment). The inventor(s) has noted that NEAT is currently enforced as an example, and the civil service exam or Scholastic Aptitude Test (SAT) English test may be replaced with NEAT. In such an English ability test, an automated writing evaluation system is introduced to evaluate writing ability.

The automated writing evaluation system grammatically analyzes a written sentence and evaluates whether the written sentence is grammatically appropriate through error detection. The inventor(s) has noted that in this case, in the process of analyzing the written sentence, a process of analyzing morphemes of the sentence and tagging parts of speech to the morphemes is indispensably required. Because a morpheme analyzing and part-of-speech tagging device of the related art depends upon only part-of-speech sequence information without also considering vocabulary, parts of speech, meanings, and contextual co-occurrence relations of peripheral words, the inventor(s) has experienced that there is a problem in that accuracy is significantly degraded.

The inventor(s) has noted that to solve this problem, an error detection and correction method of complementarily applying rule information and statistical information of words using a dictionary, a language model, and the like, and constructing peripheral word rules and word context information has been proposed.

The inventor(s), particularly, has noted that the language model represents a connection relation between words based on grammatical statistical information using a probability, easily extract the connection relation from many text sentences of a given region, and have high accuracy in error detection. However, actual language naturally varies with time and place rather than obeying standardized rules, and thus often differs from the grammatical statistical information. For example, implied words, Internet terminology, newly established modern language, and the like, violate grammar, but is often used in real life and is detected as errors based on grammatical statistical information.

Accordingly, the inventor(s) has noted that in writing evaluation, there is need of an approach capable of minimizing errors in error detection by applying patterns frequently used by people nowadays, even when a complex rule is not continuously generated, and accurately correcting detected errors.

SUMMARY

In accordance with some embodiments, an error detection system for automatically evaluating writing includes an example construction apparatus and an error detection apparatus. The example construction apparatus collects example sentences including various literary styles, breaks up the collected example sentences in units of morphemes, and constructs the example sentences in an example-based index database (DB). The error detection apparatus breaks up an input sentence in units of morphemes, generates one or more morpheme sequences bound in arbitrary window sizes based on one or more of morphemes of the broken-up input sentence, searches the example-based index DB for each of the generated morpheme sequences, and detects an error according to a frequency at which said each morpheme is arranged in a corresponding morpheme sequence among morpheme sequences searched for through the example-based index DB.

In accordance with some embodiments, an error detection system for automatically evaluating writing includes an input sentence break-up unit, a part-of-speech tagging unit and an error detecting unit. The input sentence break-up unit is configured to break up an input sentence in units of morphemes. The part-of-speech tagging unit is configured to tag a part of speech to each of the morphemes of the broken up input sentence. And the error detecting unit is configured to generate one or more morpheme sequences bound in an arbitrary window size for said each morpheme to which the part of speech has been tagged, to search an example-based index database (DB) for each of the generated morpheme sequences, and to detect an error section according to a frequency at which said each morpheme is arranged in a corresponding morpheme sequence among morpheme sequences searched for through the example-based index DB.

In accordance with some embodiments, an error detection apparatus is configured to break up an input sentence in units of sentences and morphemes, to tag a part of speech to each of the morphemes of the broken up input sentence, to generate one or more morpheme sequences by binding one or more morphemes positioned in a forward or backward direction in an arbitrary window size for said each morpheme to which the part of speech has been tagged, to search an example-based index data base (DB) for each of the generated morpheme sequences, and to detect an error section according to a frequency at which said each morpheme is arranged in a corresponding morpheme sequence among morpheme sequences searched for through the example-based index DB.

DETAILED DESCRIPTION

The following description makes reference to the accompanying drawings in detail. However, one of ordinary skill in the art will understand the following description is not limited to the embodiments specifically disclosed below and is implemented in various forms and the scope of the following description is not limited to the following embodiments. Well known techniques, elements, structures, and processes will be omitted to avoid obscuring the subject matter of the disclosure. According to embodiments disclosed herein, the performance of writing evaluation is improved by collecting and constructing a sentence (example sentence) based on a natural representation rather than a standardized rule of a language, analyzing an input sentence based on the collected and constructed sentence (example sentence) to detect an error, and proposing an amendment to an error if necessary.

The term "example" used herein refers to the dictionary meaning of "example in use", and refers to an example sentence in which a specific word is used in a linguistic field. In particular, "example" used herein includes all sentences used in real life as sentences that do not obey standardized rules, and sentences including various literary styles, rather than a corpus in which a sentence is configured based on a standardized grammatical structure.

Figure 1:
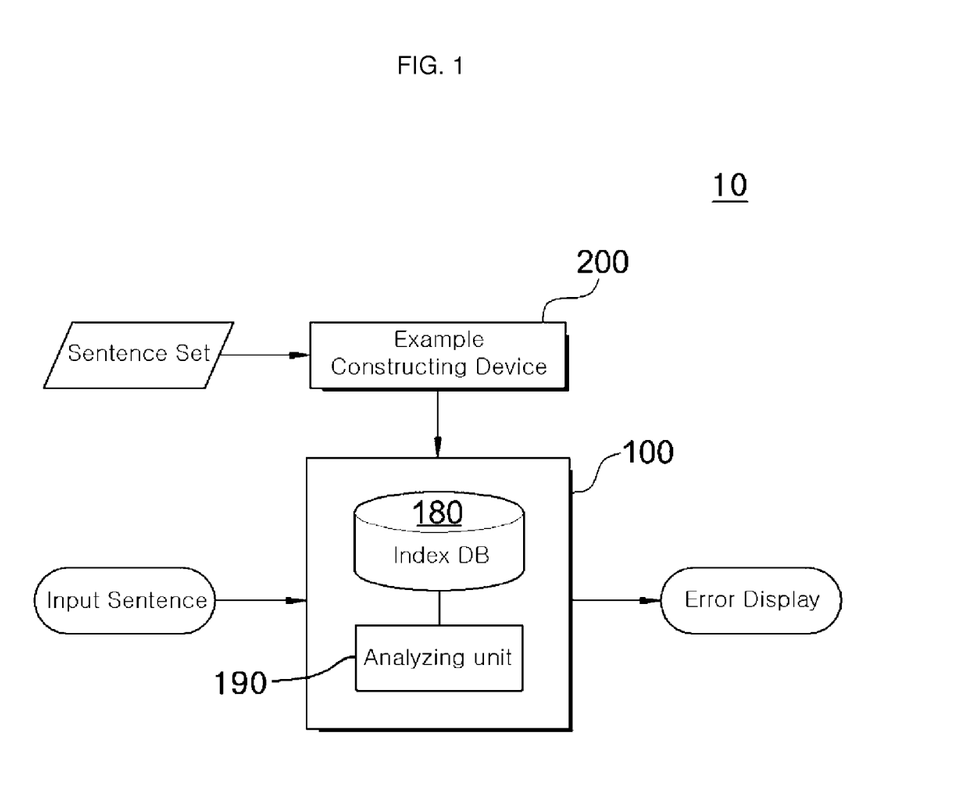
FIG. 1 is a configuration diagram of an error detection system for automatically evaluating writing according to at least one embodiment.

FIG. 1 is a configuration diagram of an error detection system for automatically evaluating writing according to at least one embodiment.

The error detection system 10 includes an example construction apparatus 200 and an error detection apparatus 100.

The example construction apparatus 200 constructs a large-volume index DB 180 to be used for error detection by collecting example sentences from a sentence set exposed from language transmission media such as the Internet, news, and newspaper articles. This constructed index DB 180 stores statistical information based on various examples.

The error detection apparatus 100 detects an error from an input sentence input to an analyzing unit 190 using the index DB 180 constructed by the example construction apparatus 200, and displays the detected error. In addition, the error detection apparatus 100 performs an error correction function by proposing an amendment to the detected error.

The error detection apparatus 100 is characterized in that an error is detected from an input sentence based on example-based statistical information. In addition, it is characterized by using an n-gram search scheme of comparing and searching for statistical information in units of sections bound in units of arbitrary windows without searching for the input sentence in its entirety when an error is detected.

In general, the n-gram search scheme includes a bigram for classifying sections in units of two windows, a trigram for classifying sections in units of three windows, and the like. These consider frequencies of occurrence of one or two previous contexts according to a window size. Other components of the error detection system 10, such as the error detection apparatus 100, the analyzing unit 190 and the example construction apparatus 200 are implemented by one or more processors and/or application-specific integrated circuits (ASICs).

Figure 2:
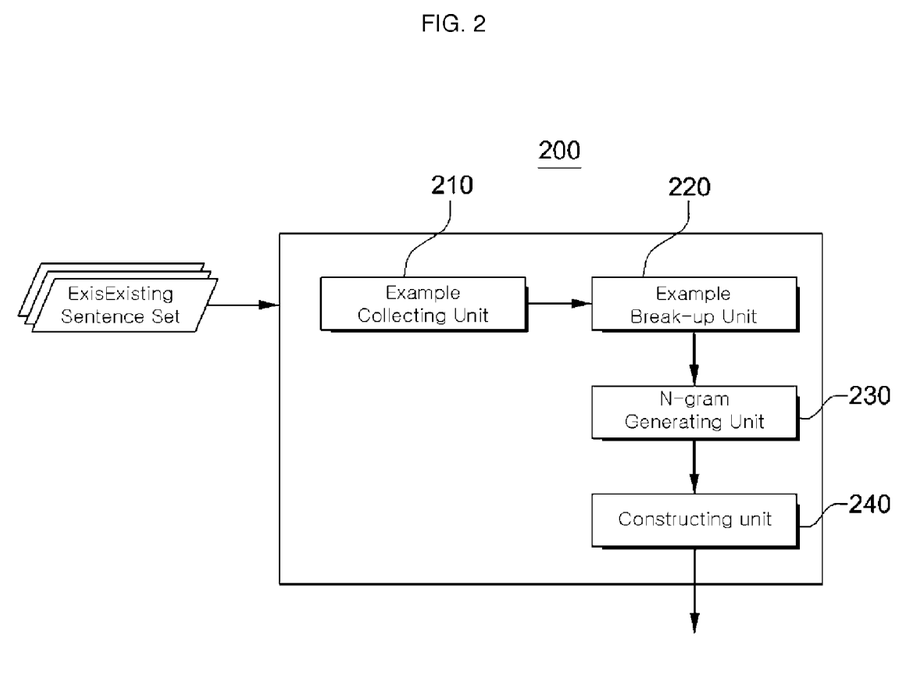
FIG. 2 is a configuration diagram of an example construction apparatus of an error detection system according to at least one embodiment.

Specifically, the example construction apparatus 200 is configured as illustrated in FIG. 2.

Referring to FIG. 2, the example construction apparatus 200 includes an example collecting unit 210, an example break-up unit 220, an n-gram generating unit 230, and a constructing unit 240. Other components of the example construction apparatus 200, such as the example collecting unit 210, the example break-up unit 220, the n-gram generating unit 230, and the constructing unit 240 are implemented by one or more processors and/or application-specific integrated circuits (ASICs).

The example collecting unit 210 collects example sentences from a large number of sentence sets exposed through language transmission media such as the Internet, news, and newspaper articles. At this time, the example sentences are assumed to include all sentences used in real life, sentences including various literary styles, and the like. Because the number of errors contained in news and newspaper articles is less than in other media, the news and newspaper articles are utilized.

This example collecting unit 210 may automatically collect an example sentence when there is an example sentence to which an input keyword is applied while a sentence set exposed through a corresponding language transmission medium is monitored after keywords desired to be collected are input in advance.

The example break-up unit 220 breaks up example sentences collected by the example collecting unit 210 in units of sentences and morphemes. Sentence break-up represents a process of breaking up a plurality of example sentences in units of sentences using punctuation marks such as a period, a question mark, and an exclamation mark, and morpheme break-up represents a process of breaking up each of the example sentences broken up in units of sentences in units of morphemes.

The n-gram generating unit 230 generates a morpheme sequence bound in an arbitrary n-window size for each morpheme broken up by the example break-up unit 220. At this time, the morpheme sequence is generated by binding morphemes positioned in a forward or backward direction based on each morpheme. For example, morpheme sequences generated using a 3-window size from an example sentence "I want to go to school" may be generated as a morpheme sequence "I want to" for the morpheme "I," morpheme sequences "want to go" and "(null) I want" for the morpheme "want," and morpheme sequences "to go to" and "I want to" for the morpheme "to." These are used to store the example sentences in units of sentences and morpheme sequences when the example sentences are constructed in the index DB 180.

The constructing unit 240 matches and creates the morpheme sequences generated by the n-gram generating unit 230 and the corresponding example sentence in the index DB (denoted by 180 in FIG. 1).

Figure 7:
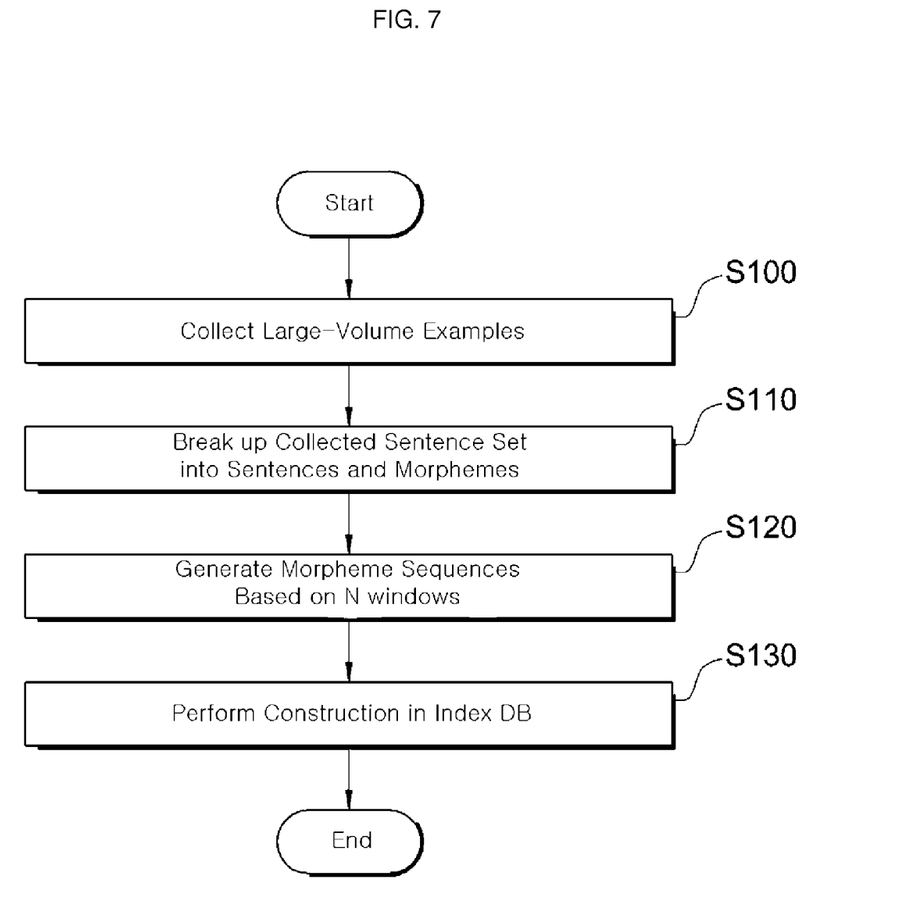
FIG. 7 is a flowchart of constructing an example-based DB for automated writing evaluation according to at least one embodiment.

Accordingly, the example constructing device 200 configured as described above performs construction through a process illustrated in FIG. 7.

First, the example collecting unit 210 collects desired example sentences from a large number of sentence sets through language transmission media such as the Internet, news, and newspaper articles (S100). At this time, example sentences are automatically collected when there is an example sentence to which an input keyword is applied while a sentence set exposed through a corresponding language transmission medium is monitored after keywords desired to be collected are input in advance so that the desired example sentences are collected.

Thereafter, the example break-up unit 220 breaks up a set of example sentences collected by the example collecting unit 210 into sentences and morphemes (S110).

Thereafter, the n-gram generating unit 230 generates a morpheme sequence bound in an arbitrary window size for each morpheme (S120).

Thereafter, the constructing unit 240 matches and creates a morpheme sequence generated in a previous operation and a corresponding example sentence in the index DB (S130).

Figure 3:
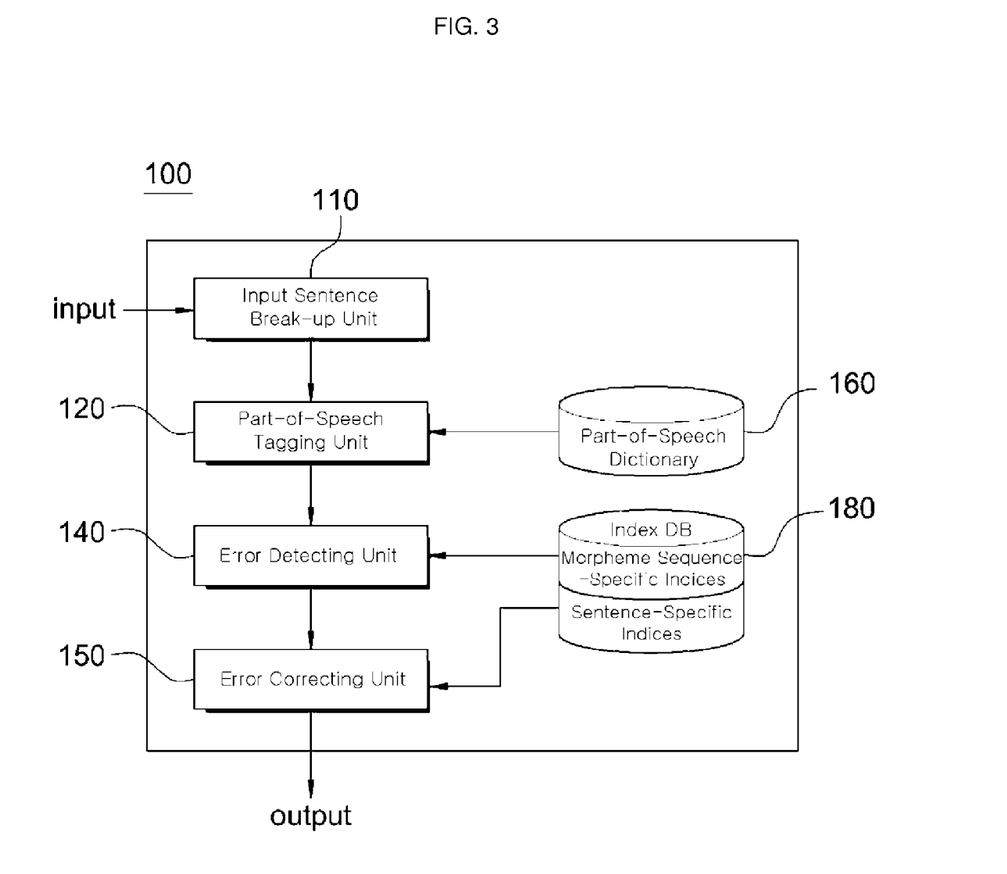
FIG. 3 is a configuration diagram of an error detection apparatus of an error detection system according to at least one embodiment.

FIG. 3 is a configuration diagram of an error detection apparatus of an error detection system according to at least one embodiment.

The error detection apparatus 100 includes an input sentence break-up unit 110, a part-of-speech tagging unit 120, an error detecting unit 140, an error correcting unit 150, a part-of-speech dictionary 160, and an index DB 180. Other components of the error detection apparatus 100, such as the input sentence break-up unit 110, the part-of-speech tagging unit 120, the error detecting unit 140, the error correcting unit 150 and the part-of-speech dictionary 160 are implemented by one or more processors and/or application-specific integrated circuits (ASICs).

The input sentence break-up unit 110 receives an input sentence (i.e., a written sentence) set and breaks up the input sentence set in units of sentences and morphemes.

Here, as described above in the example construction apparatus 200, sentence break-up represents a process of breaking up a plurality of example sentences in units of sentences using punctuation marks such as a period, a question mark, and an exclamation mark. Morpheme break-up represents a process of breaking up each of the example sentences broken up in units of sentences in units of morphemes. In English, a word itself is a morpheme because no auxiliary word is arranged behind the word due to the nature of language.

The part-of-speech tagging unit 120 tags a corresponding part of speech to each morpheme broken up by the input sentence break-up unit 110 based on part-of-speech information stored in the part-of-speech dictionary 160. The parts of speech are a noun, a verb, a preposition, an adjective, an adverb, an article, an interjection, and the like.

Figure 5:
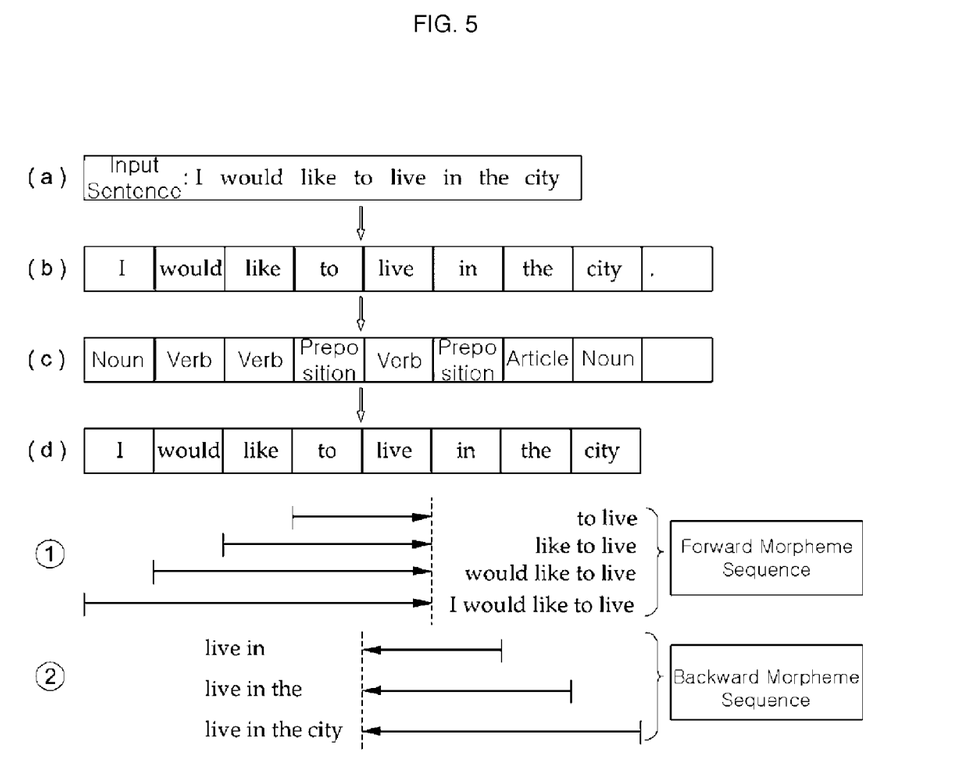
FIG. 5 is an explanatory diagram of a function to be performed in each component of FIG. 3 according to at least one embodiment.

For example, referring to FIG. 5, when an input sentence (a) "I would like to live in the city." is input, the input sentence break-up unit 110 breaks up the input sentence into elements "I," "would," "like," "to," "live," "in," "the," "city," and a period (.) as illustrated in (b). The part-of-speech tagging unit 120 sequentially tags the noun (I), the verb (would), the verb (like), the preposition (to), the verb (live), the preposition (in), the article (the), the noun (city), and the like to morphemes broken up as in (c).

Again referring to FIG. 3, the error detecting unit 140 generates a morpheme sequence bound in an arbitrary window size for each morpheme to which the part of speech has been tagged by the part-of-speech tagging unit 120, searches the index DB 180 for each generated morpheme sequence, and detects an error according to a frequency at which each morpheme is arranged in a corresponding morpheme sequence. The error detecting unit 140 performs a search in units of given sections without searching for the input sentence in its entirety, and performs fast and accurate error detection compared to a method of searching the entire input sentence.

The error correcting unit 150 extracts the morphemes arranged in the morpheme sequences searched for through the error detecting unit 140, and particularly, extracts the morphemes in descending order of frequency, and proposes at least one of the extracted morphemes having relatively higher frequencies as an amendment to a detected error. For example, let's suppose that morpheme sequences are generated using a 3-window size and then an error is detected through searching the index DB 180. In case an exemplary input sentence is "I would like live in city", a morpheme arranged in a morpheme sequence, "would like live," and having the highest frequency is proposed as a morpheme "to." At this case, the error correcting unit 150 proposes such a proposed amendment to an error in the morpheme sequence (i.e., "would like live") as, for example, "would like to live". In one embodiment, the morpheme "to" can be used for a proposed amendment only if the morpheme "to" has a frequency greater than a threshold (e.g., 50%) among all morphemes arranged in the morpheme sequence "would like live". In another embodiment, a given number of morphemes having higher frequencies than a predetermined number (e.g, another threshold) are proposed as candidates for an amendment to an error.

Although the error correcting unit 150 may propose only a morpheme of an erroneous section using the n-gram search scheme applied as an error detection scheme in a method of proposing an amendment as described above, a method of simply proposing k higher-order similar sentences by searching for sentences similar to an entire sentence may also be used.

Figure 4:
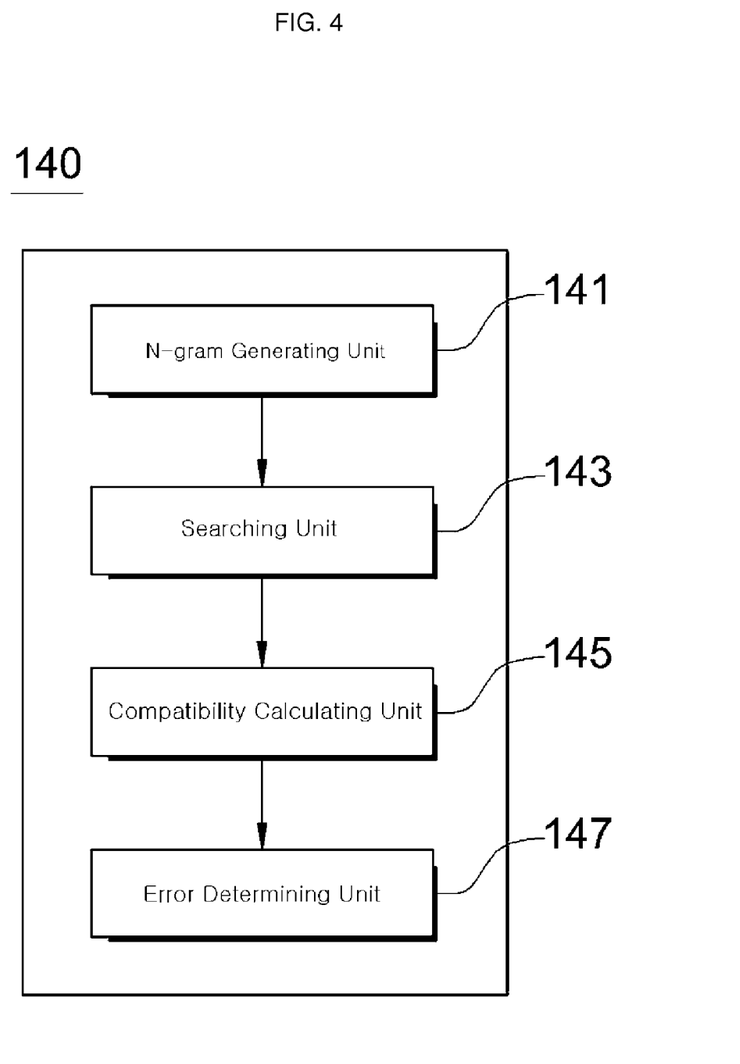
FIG. 4 is a configuration diagram of an error detecting unit of FIG. 3 according to at least one embodiment.

FIG. 4 is a detailed configuration diagram illustrating the error detecting unit 140.

Specifically, the error detecting unit 140 includes an n-gram generating unit 141, a search unit 143, a compatibility calculating unit 145, and an error determining unit 147. Other components of the error detecting unit 140, such as the n-gram generating unit 141, the search unit 143, the compatibility calculating unit 145, and the error determining unit 147 are implemented by one or more processors and/or application-specific integrated circuits (ASICs).

Like the n-gram generating unit (230 in FIG. 2) in the example constructing device (200 in FIG. 2), the n-gram generating unit 141 generates a morpheme sequence by binding morphemes positioned in a forward or backward direction in an arbitrary window size based on each morpheme to which a part of speech has been tagged by the part-of-speech tagging unit (120 in FIG. 2).

In particular, the n-gram generating unit 141 according to at least one embodiment may generate a forward morpheme sequence by binding morphemes positioned in the forward direction in an arbitrary window size, and generate a backward morpheme sequence by binding morphemes positioned in the backward direction in an arbitrary window size, based on each morpheme.

For example, in consideration of forward morpheme sequences capable of being generated for the morpheme "live" from an input sentence, examples of morpheme sequences, examples of morpheme sequences bound in at least 2- to 5-window units based on the morpheme "live" are illustrated in (d)-(1) of FIG. 5. That is, the morpheme sequence bound in the 2-window unit is "to live" and the morpheme sequence bound in the 3-window unit is "like to love." Morpheme sequences increased by one window are "would like to live" and "I would like to live." Accordingly, a frequency of occurrence of the morpheme "live" after the morpheme "to" in the morpheme sequences including the morpheme "live" or frequencies of occurrence of the morpheme "live" after "like to," "would like to," and "I would like to" may be extracted.

On the other hand, a morpheme sequence bound in an arbitrary window size for the morphemes "in," "the," and "city" positioned in the backward direction based on the morpheme "live" may be generated as illustrated in (2) of (d). A backward morpheme sequence bound in the 2-window unit may be generated as "live in," a backward morpheme sequence bound in the 3-window unit may be generated as "live in the," and a backward morpheme sequence bound in the 4-window unit may be generated as "live in the city."

At this time, the n-gram generating unit 141 may preset a window size, generate a morpheme sequence corresponding to the set window size, and utilize the generated morpheme sequence in error detection. For detailed detection, it is preferable to generate and analyze each morpheme sequence by varying the window size as in the bigram or the trigram. In this case, because a capacity for morpheme sequences stored in the index DB is significantly increased and complex, it is also possible to generate and analyze a morpheme sequence considering only one window size.

The search unit 143 searches whether there is a morpheme sequence generated by the n-gram generating unit 141 in an index DB (180 in FIG. 3) constructed by a plurality of example sentences for each morpheme included in the input sentence.

The compatibility calculating unit 145 extracts a frequency at which each morpheme is arranged from morpheme sequences searched for by the search unit 143, and calculates the compatibility based on the extracted frequency. The calculated compatibility is represented by a score indicating a frequency of a morpheme sequence for each morpheme.

At this time, when the morpheme sequence generated by the n-gram generating unit 141 is found in both the forward and backward directions, the compatibility calculating unit 145 may calculate the compatibility of each of the forward and backward morpheme sequences with respect to one morpheme, and calculate integrated compatibility by integrating the compatibility.

In addition, the compatibility calculating unit 145 may apply a different weight according to a frequency of occurrence of a morpheme sequence for each morpheme when compatibility is calculated for the forward and backward morpheme sequences. For example, when there are a morpheme sequence "live in" bound in a 2-window unit, a morpheme sequence "live in the" bound in a 3-window unit, and a morpheme sequence "live in the city" bound in a 4-window unit among backward morpheme sequences, compatibility is determined by assigning a larger weight to a morpheme with a larger number of windows and referring to more information.

The error determining unit 147 produces a graph using the compatibility for each morpheme calculated by the compatibility calculating unit 145, and detects an error section by determining whether there is a section having a compatibility score for each morpheme that is lower than a threshold (e.g., 0.1) or decreased by a given value or more in the produced graph. In the latter case, an error section is detected when a difference between the compatibility score for a certain morpheme and the compatibility score for the preceding or next morpheme is equal to or greater than a given value (e.g., 0.9). Referring to examples shown in (b) of FIG. 6, in case of the compatibility in the forward direction, a difference in compatibility score between the morpheme "live" and the preceding morpheme "to" is greater than 0.9. Therefore, a section between "to" and "live" can be detected as an error section. In case of the compatibility in the backward direction, a difference in compatibility score between the morpheme "live" and the next morpheme "in" is greater than 0.9. Therefore, a section between "live" and "in" can be detected as an error section. Similarly, in case of the integrated compatibility, a section between "to" and "live" and/or a section between "live" and "in" can be detected as an error section.

At this time, the error determining unit 147 may separately produce a graph for each of the compatibility in the forward direction, the compatibility in the backward direction, and the integrated compatibility.

Figure 6:
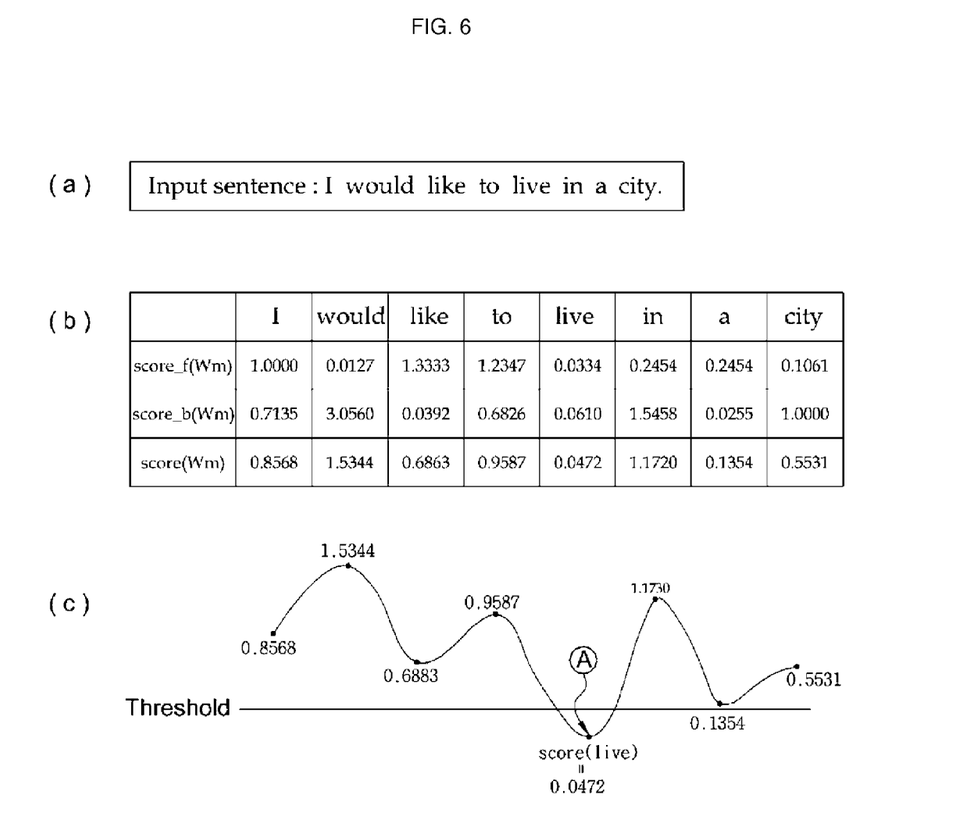
FIG. 6 is a diagram of a resulting value obtained by the error detecting unit of FIG. 3 according to at least one embodiment.

In the example illustrated in FIG. 6, (a) illustrates an input sentence, and (b) illustrates compatibility calculated for each morpheme for the input sentence.

As illustrated in (b), score_f(Wm) is forward compatibility that represents a frequency at which each morpheme is arranged in a forward morpheme sequence, score_b(Wm) is backward compatibility that represents a frequency at which each morpheme is arranged in a backward morpheme sequence, and score(Wm) is integrated compatibility obtained by averaging the forward compatibility and the backward compatibility.

Score_f(Wm) and score_b(Wm) can be obtained using the following Equations 1 and 2, respectively. Equations 1 and 2 show calculation regarding the compatibility of "live" in case an input sentence is "I would like live in city".

$$\text{Score\_f(live)} = \alpha * P\_f(\text{live} | (\text{null})\_I\_\text{would\_like}) + \quad \text{[Equation 1]}$$

$$\beta * p\_f(\text{live} | I\_\text{would\_like}) +$$

$$\gamma * P\_f(\text{live} | \text{would\_like}) + \delta * P\_f(\text{live} | \text{like})$$

$$P\_f(\text{live} | \text{like}) = \text{freq\_f}(\text{like\_live}) / \text{freq\_f}(\text{like})$$

$$P\_f(\text{live} | \text{would\_like}) =$$

$$\text{freq\_f}(\text{would\_like\_live}) / \text{freq\_f}(\text{would\_like})$$

$$P\_f(\text{live} | I\_\text{would\_like}) =$$

$$\text{freq\_f}(I\_\text{would\_like\_live}) / \text{freq\_f}(I\_\text{would\_like})$$

$$P\_f(\text{live} | (\text{null})\_I\_\text{would\_like}) = \text{freq\_f}$$

$$((\text{null})\_I\_\text{would\_like\_live}) / \text{freq\_f}((\text{null})\_I\_\text{would\_like})$$

In Equation 1, freq_f(x) refers to the frequency of a certain morpheme "x" in the index DB 180. Equation 1 shows examples of calculating the compatibility in the forward direction by considering respectively a 2-window morpheme sequence "like live", a three-window morpheme sequence "would like live", a four-window morpheme sequence "I would like live", and a five-window morpheme sentence "(null) I would like live". Such window sizes are exemplary only and thus varied as discussed above.

$$Score\_b(live) = $$
$$\alpha * P\_b(live | (null)\_.\_city\_in) + \beta * P\_b(live | .\_city\_in) +$$
$$\gamma * P\_b(live | city\_in) + \delta * P\_b(live | in)$$

$$P\_b(live | in) = freq\_b(in\_live)/freq\_b(in)$$

$$P\_b(live | city\_in) = freq\_b(city\_in\_live)/freq\_b(city\_in)$$

$$P\_b(live | .\_city\_in) =$$
$$freq\_b(.\_city\_in\_live)/freq\_b(.\_city\_in)$$

$$P\_b(live | (null)\_.\_city\_in) =$$
$$freq\_b((null)\_.\_city\_in\_live)/freq\_b((null)\_.\_city\_in)$$

[Equation 2]

In Equation 2, freq_b(x) refers to the frequency of a certain morpheme "x" in the index DB 180. Equation 2 shows examples of calculating the compatibility in the backward direction by considering respectively a 2-window morpheme sequence "live in", a three-window morpheme sequence "live in city", a four-window morpheme sequence "live in city.", and a five-window morpheme sentence "live in city. (null)". Such window sizes are exemplary only and thus varied as discussed above.

In Equations 1 and 2, coefficients $\alpha$, $\beta$, $\gamma$ and $\delta$ are determined experimentally. Initial values of such coefficients are obtained using the below Equation 3.

$$\alpha = 5^2/(\alpha+\beta+\gamma+\delta)$$

$$\beta = 4^2/(\alpha+\beta+\delta)$$

$$\gamma = 3^2/(\alpha+\beta+\gamma+\delta)$$

$$\delta = 2^2(\alpha+\beta+\gamma+\delta)$$

[Equation 3]

(c) illustrates a graph produced using the integrated compatibility illustrated in (b). As seen from this graph, there is an error due to a missing word or the like around "A", less than or equal to a threshold, that is, around the morpheme "live." This threshold is determined experimentally.

A method of detecting an error using the above error detection apparatus will be described.

Figure 8:
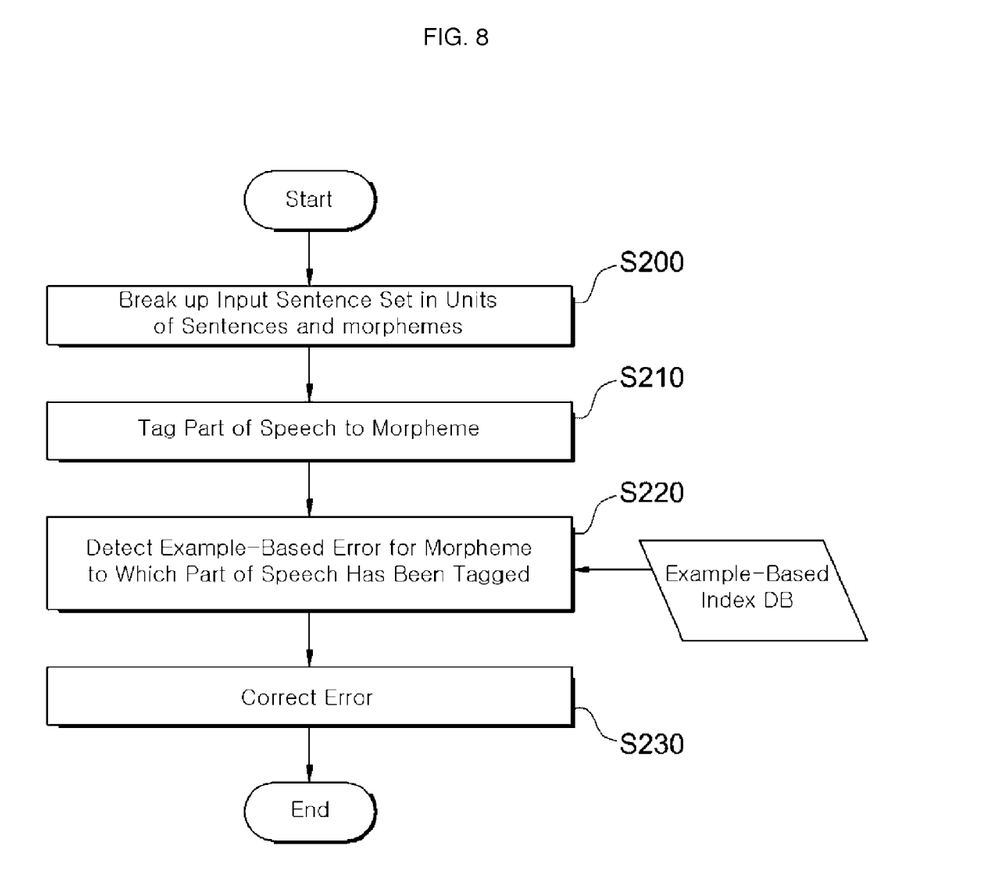
FIG. 8 is a flowchart of detecting an error for automated writing evaluation according to at least one embodiment.
Figure 9:
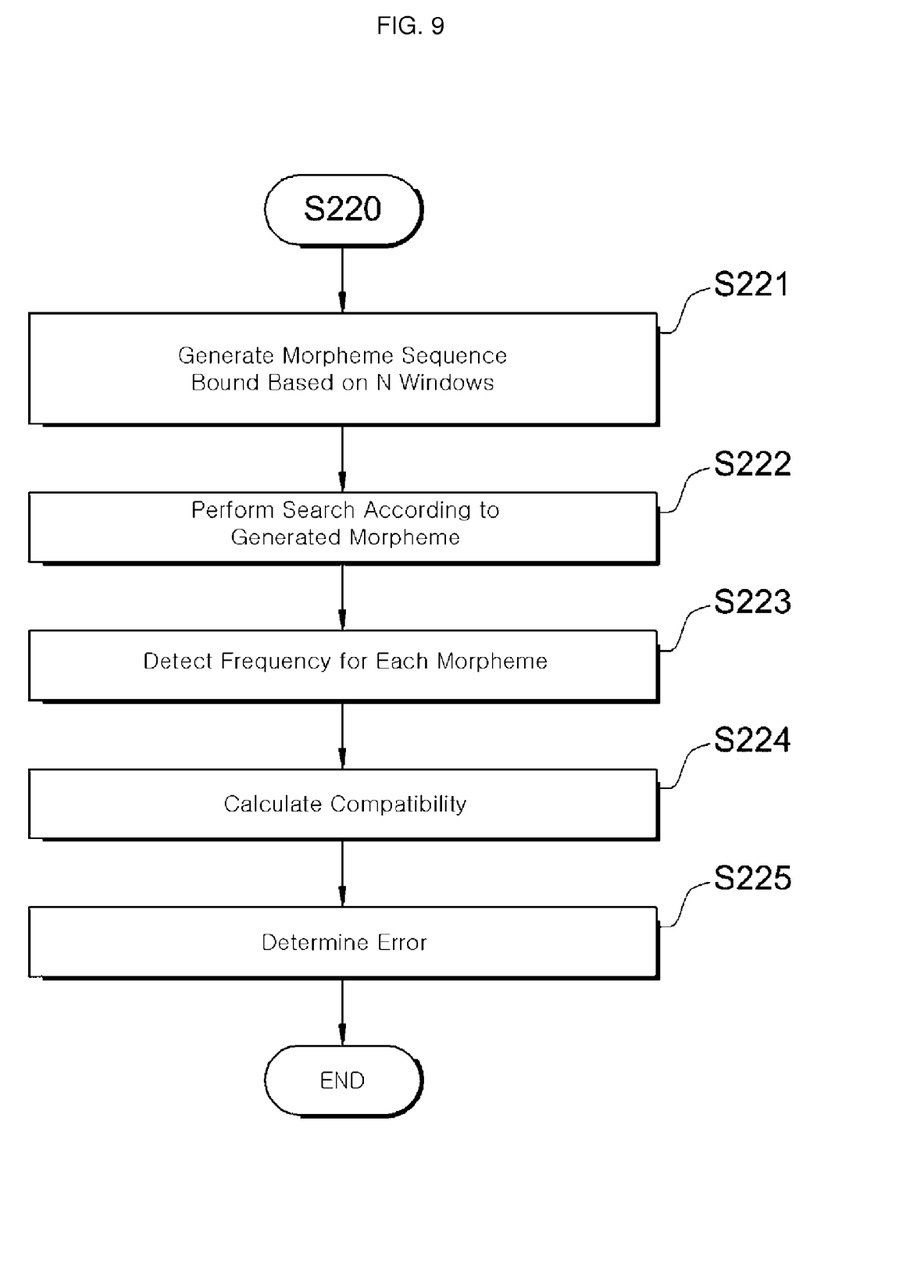
FIG. 9 is a detailed diagram of an error detection process of FIG. 8 according to at least one embodiment.

FIG. 8 is a flowchart illustrating a method of detecting an error for automated writing evaluation according to at least one embodiment. FIG. 9 is a detailed diagram illustrating an error detection process of FIG. 8.

Here, an example-based DB utilizing error detection is assumed to be previously constructed by an example construction apparatus, and an operation to be performed by the error detection apparatus will be mainly described.

First, referring to FIG. 8, when the error detection apparatus receives a set of written input sentences, the input sentence set is broken up in units of sentences and morphemes (S200).

Thereafter, the error detection apparatus tags a corresponding part of speech to each morpheme based on the part-of-speech dictionary (S210).

Thereafter, the error detection apparatus generates morpheme sequences bound in an arbitrary window size for each morpheme to which a part of speech has been tagged, searches the example-based index DB for each generated morpheme sequence, and detects an error through a comparison operation (S220). Specific error detection will be described in detail with reference to FIG. 9.

Thereafter, when an amendment to the detected error is proposed, a process of extracting a morpheme arranged in a morpheme sequence among morpheme sequences searched for from the example-based index DB in descending order of frequency, or a process of enabling correction to be performed by extracting and proposing several similar sentences, may be performed (S230).

Next, referring to FIG. 9, in the error detection operation S220, a morpheme sequence bound in an arbitrary window size is specifically generated for each morpheme of an input sentence (S221). The morpheme sequences may be classified into and generated as a forward morpheme sequence bound in the forward direction and a backward morpheme sequence bound in the backward direction based on each morpheme as described above.

Thereafter, it is searched whether there is a generated morpheme sequence in the index DB for each morpheme (S222).

Thereafter, a frequency at which each morpheme is arranged in a searched morpheme sequence is extracted and compatibility is calculated based on the extracted frequency (S223 and S224). The compatibility is converted into a score as a degree of whether each morpheme arranged in a corresponding morpheme sequence is appropriate. A calculation method related to the compatibility score is the same as described above.

Thereafter, a graph for the calculated compatibility score is produced and an error may be detected using the produced graph (S225). For example, an erroneous section is detected by determining whether a compatibility score for each morpheme in the graph is lower than a threshold or is decreased by a given value or more.

As fully discussed hereinbefore, it is difficult for the automated writing evaluation system of the related art to evaluate writing that does not obey standardized rules by detecting errors using a dictionary, a language model, or the like constructed based on word rules and word context information. However, according to embodiments disclosed herein, example sentences including various literary styles are collected through the Internet or other language transmission media and an example-based database is constructed, wherein, when a written input sentence is input, the input sentence is broken up in units of morphemes, a morpheme sequence bound in a predetermined window size is generated from the morphemes, and then each morpheme sequence is analyzed using the frequencies of morpheme sequences shown in the example-based database, thereby detecting an error for each morpheme and improving the performance of automatic evaluation. In this way, the disclosed embodiments can be applied to more than just an evaluation algorithm, but to college entrance exams and English ability tests and English writing tests, etc. conducted in domestic enterprises, thereby enabling automatic evaluation.

Some embodiments as described above are implemented in the form of one or more program commands that can be read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While various embodiments have been particularly shown and described, it will be understood by those skilled in the art that various changes in form and details may be made therein without departing from the subject matter and the scope of the claimed invention. Specific terms used in this disclosure and drawings are used for illustrative purposes and not to be considered as limitations of the present disclosure.

What is claimed is:

1. An error detection system for automatically evaluating writing, the system comprising:
   an example construction apparatus, implemented by one or more processors and/or application-specific integrated circuits (ASICs), configured
      to collect example sentences including various literary styles,
      to break up the collected example sentences in units of morphemes, and
      to construct the example sentences in an example-based index database (DB); and
   an error detection apparatus, implemented by one or more processors and/or application-specific integrated circuits (ASICs), configured
      to break up an input sentence in units of morphemes,
      to generate one or more morpheme sequences by binding one or more morphemes of the broken up input sentence in a forward direction or a backward direction in an arbitrary window size based on each morpheme to which the part of speech has been tagged, wherein the one or more morpheme sequences includes (i) forward morpheme sequences generated by binding morphemes positioned in the forward direction in the arbitrary window size and (ii) backward morpheme sequences by binding morphemes positioned in the backward direction in the arbitrary window size, and the arbitrary window size is determined based on a size of each morpheme sequence, and
      wherein the one or more morpheme sequences are generated by varying the arbitrary window size,
      to search the example-based index DB for each of the one or more morpheme sequences,
      to extract a frequency at which each morpheme searched is arranged from the one or more morpheme sequences;
      to calculate a frequency for occurring to arrange each morpheme of the broken-up input sentence in a corresponding morpheme sequence among the one or more morpheme sequences searched for through the example-based index DB, and
      to detect an error section based on the calculated frequency, and by determining whether there is a section having a compatibility score for each morpheme that is lower than a threshold, or decreased by a predetermined value or more,
   wherein the error detection apparatus is further configured to calculate the compatibility for each of the forward morpheme sequences and the backward morpheme sequences generated, and to calculate integrated compatibility reflecting the compatibility.

2. The error detection system of claim 1, wherein the calculated compatibility is represented by a score indicating the frequency for each morpheme, the frequency at which each morpheme of the broken-up input sentence is arranged in a corresponding morpheme sequence among the one or more morpheme sequences searched for through the example-based index DB.

3. An error detection apparatus, including one or more processors and/or application-specific integrated circuits (ASICs), the error detection apparatus comprising:
   an input sentence break-up unit, implemented by the one or more processors and/or the ASICs, and configured to break up an input sentence in units of morphemes;
   a part-of-speech tagging unit, implemented by the one or more processors and/or the ASICs, and configured to tag a part of speech to each of the morphemes of the broken up input sentence; and
   an error detecting unit, implemented by the one or more processors and/or the ASICs, and configured
      to generate one or more morpheme sequences by binding one or more morphemes of the broken up input sentence in a forward direction or a backward direction in an arbitrary window size based on each morpheme to which the part of speech has been tagged, wherein the one or more morpheme sequences includes (i) forward morpheme sequences generated by binding morphemes positioned in the forward direction in the arbitrary window size and (ii) backward morpheme sequences by binding morphemes positioned in the backward direction in the arbitrary window size, and the arbitrary window size is determined based on a size of each morpheme sequence,
      to vary the arbitrary window size for generating the one or more morpheme sequences,
      to search an example-based index database (DB) for each of the one or more morpheme sequences,
      to calculate a frequency for occurring to arrange each morpheme of the broken-up input sentence in a corresponding morpheme sequence among the one or more morpheme sequences searched for through the example-based index DB, and
      to detect an error section based on the calculated frequency by determining whether the calculated compatibility is lower than a threshold or whether the calculated compatibility has been decreased by a predetermined value or more, and
   wherein the error detecting unit includes:
   wherein the error detecting unit includes:
   an N-gram generating unit, implemented by the one or more processors and/or the ASICs, and configured to generate, based on said each morpheme,
   the forward morpheme sequences by binding one or more morphemes of the broken up input sentence in the forward direction in the arbitrary window size, the backward morpheme sequences by binding one or more morphemes of the broken up input sentence in the backward direction in the arbitrary window size, and a compatibility calculating unit, implemented by the one or more processors and/or the ASICs, and configured to extract the frequency at which said each morpheme is arranged from morpheme sequences searched for by a search unit, calculate for each of the forward morpheme sequences and the backward morpheme sequences generated by the N-gram generating unit, and calculate integrated compatibility reflecting the compatibility.

4. The error detection apparatus of claim 3, wherein the error detecting unit further includes:

the search unit, implemented by the one or more processors and/or the ASICs, and configured to search whether the one or more morpheme sequences generated by the N-gram generating unit are included in the example-based index DB constructed by a plurality of example sentences for said each morpheme.

5. The error detection apparatus of claim 4, wherein the compatibility calculating unit is further configured to calculate the compatibility by applying a different weight according to the frequency at which said each morpheme is arranged from the morpheme sequences searched for by the search unit.

6. The error detection apparatus of claim 3, further comprising:

an error correcting unit, implemented by the one or more processors and/or the ASICs, and configured to extract at least one morpheme in descending order of frequency in the morpheme sequences searched for by the search unit, and to propose the extracted morpheme as an amendment to the error section detected by the error detecting unit.

7. An error detection method of automatically evaluating writing performed by an error detection apparatus, the error detection apparatus implemented by one or more processors and/or application-specific integrated circuits (ASICs) to execute the method comprising:

breaking up an input sentence in units of sentences and morphemes;

tagging a part of speech to each of the morphemes of the broken up input sentence;

generating one or more morpheme sequences by binding one or more morphemes positioned in a forward direction or a backward direction in an arbitrary window size for said each morpheme to which the part of speech has been tagged, wherein the one or more morpheme sequences includes (i) forward morpheme sequences generated by binding morphemes positioned in the forward direction in the arbitrary window size and (ii) backward morpheme sequences by binding morphemes positioned in the backward direction in the arbitrary window size, and the arbitrary window size is determined based on a size of each morpheme sequence;

varying the arbitrary window size for generating the one or more morpheme sequences;

searching an example-based index data base (DB) for each of the one or more morpheme sequences;

calculating a frequency for occurring to arrange each morpheme of the broken-up input sentence in a corresponding morpheme sequence among the one or more morpheme sequences searched for through the example-based index DB; and detecting an error section based on the calculated frequency by determining whether the calculated compatibility is lower than a threshold or whether the calculated compatibility has been decreased by a predetermined value or more, and wherein, when the generated morpheme sequences include both a forward morpheme sequence and a backward morpheme sequence, the calculating of the frequency comprising:

extracting the frequency at which said each morpheme is arranged in respect to the forward morpheme sequence and the backward morpheme sequence, calculating compatibility for each of the forward morpheme sequence and the backward morpheme sequence, and calculating integrated compatibility reflecting the compatibility.

8. The error detection method of claim 7, further comprising:

extracting at least one morpheme in descending order of frequency in morpheme sequences searched for through the example-based index DB and proposing the extracted morpheme as an amendment to the error section.

9. The error detection method of claim 7, wherein the step of generating one or more morpheme sequences includes:

based on said each morpheme, generating forward morpheme sequences by binding morphemes positioned in the forward direction in the arbitrary window size and backward morpheme sequences by binding one or more morphemes positioned in the backward direction in the arbitrary window size.

10. The error detection method of claim 7, wherein the step of detecting an error section includes:

searching whether there is each of the generated morpheme sequences in the example-based index DB for said each morpheme;

extracting a frequency at which said each morpheme is arranged in morpheme sequences searched for from the example-based index DB to calculate compatibility based on the extracted frequency; and detecting an error section by determining whether the calculated compatibility is lower than a threshold or whether the calculated compatibility is decreased by a predetermined value or more.

11. The error detection method of claim 10, wherein the calculating of the compatibility in the step of extracting a frequency includes:

calculating the compatibility by applying a different weight according to a frequency at which said each morpheme is arranged from the morpheme sequences searched for from the example-based index DB.

* * * * *